(12) United States Patent
Broto Solano

(10) Patent No.: US 8,783,325 B2
(45) Date of Patent: Jul. 22, 2014

(54) LONGITUDINAL CONTINUOUS WELDING DEVICE FOR PACKAGING MACHINES

(75) Inventor: José M$^a$ Broto Solano, Barcelona (ES)

(73) Assignee: Eficiencia y Tecnologia, S.A., Barbera del Valles (Barcelona) (ES)

(*) Notice: Subject to any disclaimer, the term of this patent is extended or adjusted under 35 U.S.C. 154(b) by 25 days.

(21) Appl. No.: 13/467,683

(22) Filed: May 9, 2012

(65) Prior Publication Data

US 2012/0285626 A1 Nov. 15, 2012

(30) Foreign Application Priority Data

May 12, 2011 (ES) .................................. 201130517

(51) Int. Cl.
*B32B 37/00* (2006.01)
*B29C 65/08* (2006.01)

(52) U.S. Cl.
CPC ............. *B29C 65/085* (2013.01); *B29C 65/088* (2013.01)

USPC ..................................... 156/580.2; 156/580.1

(58) Field of Classification Search
USPC .......... 156/73.1, 290, 308.4, 553, 555, 580.1, 156/580.2, 582

See application file for complete search history.

(56) References Cited

U.S. PATENT DOCUMENTS 4,980,213 A * 12/1990 Obeda .............................. 428/57
6,592,711 B1 * 7/2003 Kubik ......................... 156/580.1
7,449,084 B2 * 11/2008 Nakakado .................. 156/580.1

* cited by examiner

*Primary Examiner* — James Sells
(74) *Attorney, Agent, or Firm* — Leason Ellis LLP

(57) ABSTRACT

A longitudinal continuous welding device for packaging machines includes structural features aimed at enabling it to act continuously on opposite sides of layers of material to be welded, joining and welding them continuously, as they pass through the inside of the welding device, while the device remains static, without the possibility of movement in the direction in which the layers of material to be welded advance.

4 Claims, 5 Drawing Sheets

LONGITUDINAL CONTINUOUS WELDING DEVICE FOR PACKAGING MACHINES

CROSS REFERENCE TO RELATED APPLICATION

This application claims priority under 35 U.S.C. §119 to Spanish patent application No. 201130517, filed May 12, 2011, which is hereby incorporated by reference in its entirety.

TECHNICAL FIELD

The present invention refers to a welding device that is applicable in packaging machines and is capable of making containers continuously from two or more layers of weldable thermoplastic material and more particularly, refers to a longitudinal continuous welding device for packaging machines, which presents structural features aimed at enabling it to act continuously on opposite sides of layers of material to be welded, joining and welding them continuously, as they pass through the inside of the welding device, while the device remains static, without the possibility of movement in the direction in which the layers of material to be welded advance.

BACKGROUND

Different antecedents of packaging machines exist on the market, which make containers continuously from one or more sheets of weldable thermoplastic material, and these containers are filled with the product to be packaged and subsequently sealed conveniently.

These packaging machines usually comprise welding devices formed of heated soldering irons attached to actuating clamps that carry out alternate opening and closing movements. When the clamps are closed, the heated soldering irons act on the superimposed layers of material to be welded, causing them to be welded together.

Static welding devices, which are unable to move in the direction in which the layers of material to be welded advance, require the sheets or layers of material making up the container to move intermittently, carrying out the welding when the progress of the layers of material to be welded stops. Obviously, this type of welding device prevents really continuous operating of the packaging machine.

Welding devices also exist that have heated soldering irons attached to opening and closing clamps, in the same way as the previous ones, but which can be displaced longitudinally in a different way, accompanying the layers of material to be joined as they are welded together, and returning to the original open position to begin a new welding cycle.

These welding devices, which are able to move differently in a longitudinal direction, enable continuous work to take place, but have limited production capacity, precisely because of the complexity of the necessary mechanisms causing the rapid forward and backward movement, and the inertia caused by this movement.

It should be mentioned that these welding devices, with heated clamps, are used both for welding the perimeter of the container, horizontally and vertically, and for joining other layers of material, for example surface areas or lateral sides of the containers, with continuous closing elements, by means of complementary seals that make the successive opening and closing of the container possible once it is open.

Consequently, the aforementioned welding devices present the inconvenience of limiting the production capacity of packaging machines, and an additional problem consists of the possible existence of waste or particles from material to be packaged, in areas in which welding takes place, preventing the heated clamps from providing a tight seal on the container, especially in the case of liquids. Manufacturers of packaging machines are perfectly aware of this problem, especially when they package liquid, doughy or granulated products.

In addition to the aforementioned problem, it should be highlighted that the most problematic welding to be conducted for containers is when it is oriented longitudinally, in the direction of movement of the containers, as this welding has a longer length than vertical welding, which can be made more easily and in less time due to the shorter length in the direction of movement of the containers.

Consequently, the technical problem approached involves a longitudinal continuous welding device for packaging machines that enables longitudinal welding to be carried out continuously, without the need for the layers of material due to be welded to trace intermittent stop-start movements, and without the welding device needing to trace longitudinal forward and backward movements.

Another objective of the invention is to enable the longitudinal continuous welding device to be suitable for the layers of material to be welded, whether these are the opposite sides of a container itself, or the sides of complementary means of closing the container, a zip-style seal for example, and regardless of whether there are remains of the material to be packaged between the layers of material to weld.

SUMMARY

The longitudinal continuous welding device for packaging machines, the object of this invention, comprises at least one support piece for the layers of material to weld continuously, and at least one ultrasonic welder with a sonotrode. The sonotrode and supporting piece face each other horizontally, placed on the opposite sides of the path of longitudinal movement of the layers of material to be welded continuously through the interior of the packaging machine, and making movement impossible in the longitudinal direction in which these layers of material to be welded advance.

In addition, the aforementioned device has at least one positioning element for the placement of the welding device in a non-operating position in which the welding iron and the supporting piece remain at a distance horizontally, or in an operating position of welding in which the sonotrode and the supporting piece are very close together; and at least one elastic pusher, which acts on the welding iron and/or the supporting piece and pushes them to the opposite sides of the layers of material to be welded continuously.

The positioning element enables the device to be placed in an non-operating position in which the sonotrode and the supporting piece remain at a distance, in order to facilitate the positioning between them of the layers of material to weld continuously, and enabling this positioning element to then arrange the welding device in the aforementioned operating position.

The elastic pusher in charge of causing the welding iron and the supporting piece to exercise pressure on the opposite sides of the layers of material to weld continuously, is of vital importance for the correct functioning of the welding device, the object of this invention, as this elastic pusher enables the separation between the welding iron and the supporting piece to vary at a very high frequency, due to the action of the sonotrode, enabling the layers of material to be welded to advance through the space between the supporting piece and the sonotrode as these conduct the welding of both layers of material.

It is important to highlight that the non-existence of this elastic pusher or another equivalent means would prevent the welding of the layers of material from taking place continuously, as these would be trapped and would not be able to advance longitudinally between the supporting piece and the sonotrode, if the latter were placing pressure on the layers of material and maintaining a pressured position without the possibility of relative movement in any direction transversally, referring to them getting mutually closer and further apart The use of an ultrasonic welder in this longitudinal continuous welding device also presents the advantage that the vibrations generated by the sonotrode cause the removal of any product particle that may be trapped within the layers of material to be welded. This guarantees the correct welding of the aforementioned layers of material to be achieved.

The sonotrode and/or the surface area that supports the layers of material to be welded has longitudinal reliefs on the front, aimed in the direction of continuous movement of the layers of material to be welded, which guarantee the formation of different parallel lines by ultrasound.

This device enables the welding of two layers of material by means of the use of an ultrasonic welder and the relevant supporting piece located opposite, with the invention including a setup whereby the welding device comprises two ultrasonic welders with respective sonotrodes facing each other on opposite sides of a supporting piece. Between the supporting piece and the sonotrodes, there are two separate passages for the circulation of two groups of layers of material to be welded continuously, and simultaneously, by the respective ultrasonic welders. This setup has different applications in packaging machines in which, during the creation of a container, an additional layer of material is welded to each of the sides of the container, for example a complementary re-sealable zip-like seal or "Zipper®". In the aforementioned setup of the device, with two ultrasonic welders arranged facing the opposite sides of a supporting piece, the aforementioned supporting piece has longitudinal channels on the opposite sides to guide at least one of the layers of material to be welded by each of the sonotrodes.

BRIEF DESCRIPTION OF THE DRAWING FIGURES

To complete the description and facilitate understanding of the different features of the invention, the present descriptive report includes a set of illustrative but not limiting diagrams in which the following can be seen:

Figure 1:
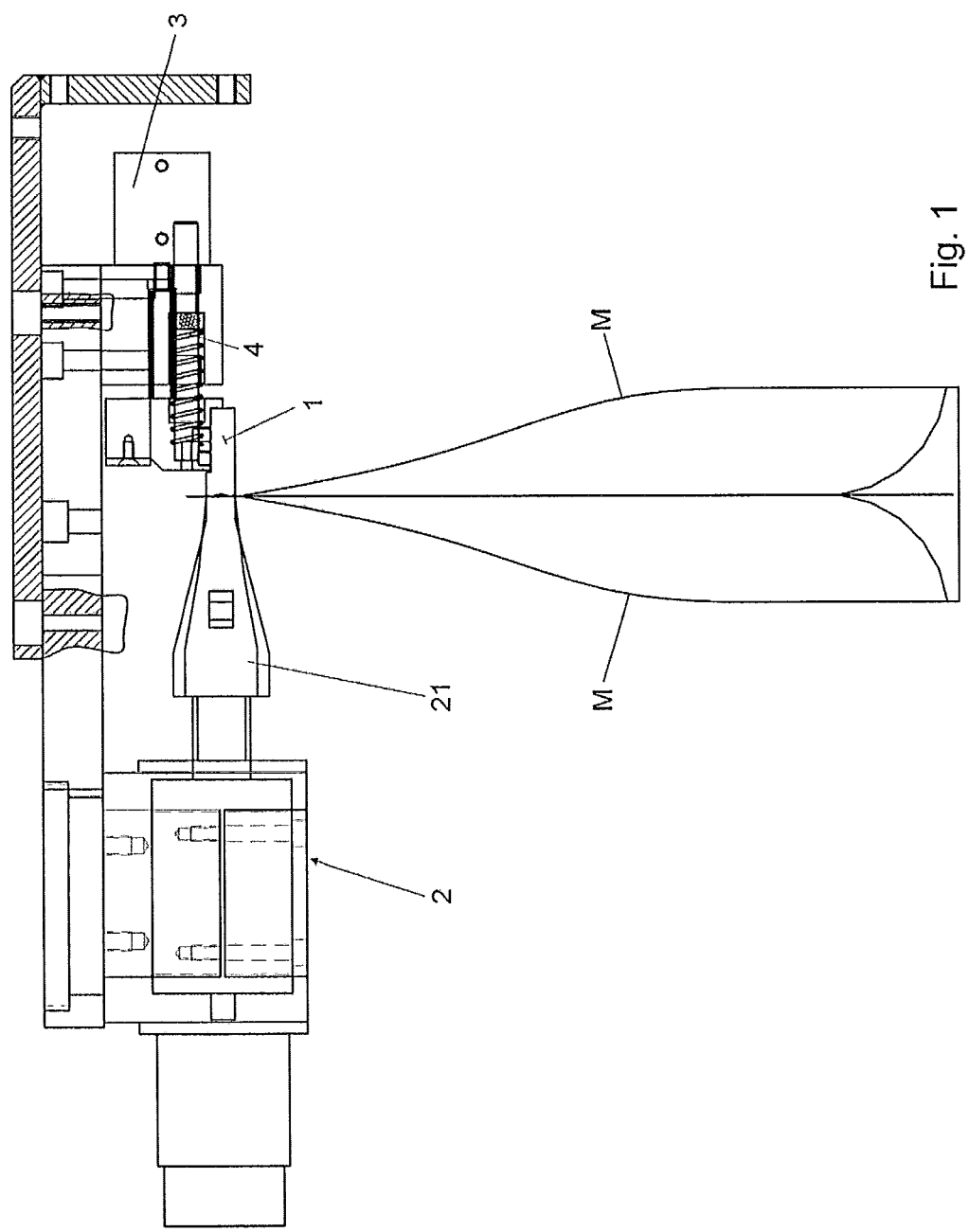
FIG. 1 shows a cross-section from above of an example of the longitudinal continuous welding device for packaging machines according to the invention, in an operating position, which comprises the supporting piece for the layers of material to be welded and, opposite, an ultrasonic welder.
Figure 2:
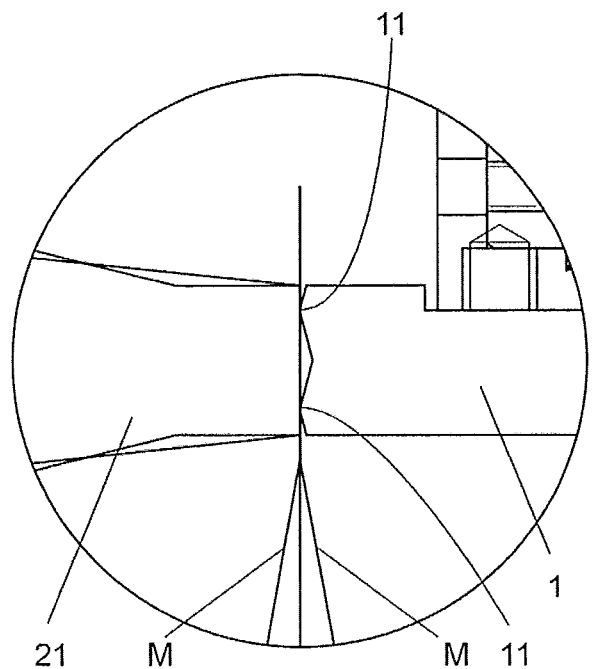
FIG. 2 shows an enlargement of the opposite ends of the sonotrode and the supporting piece of the device in the previous diagram in the operating position.
Figure 2A:
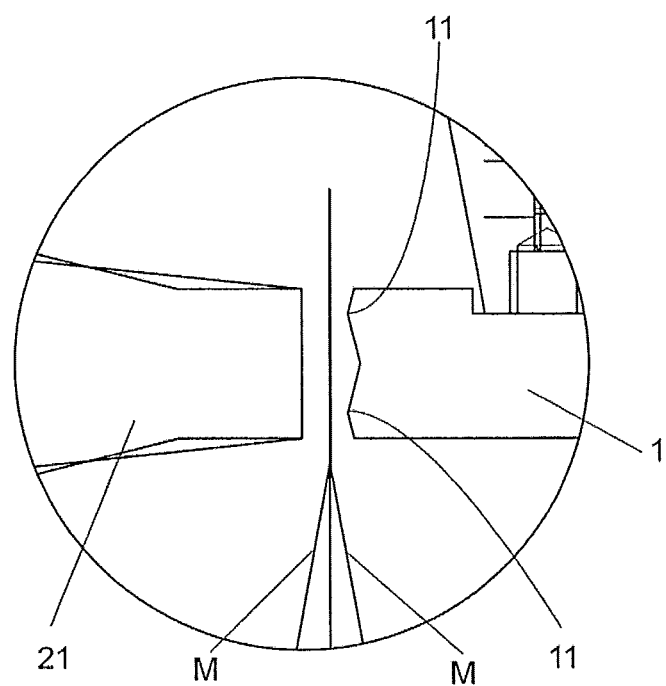
FIG. 2a shows the enlargement of the previous diagram with the sonotrode and the supporting piece distanced horizontally, in a non-operating position of the welding device.
Figure 3:
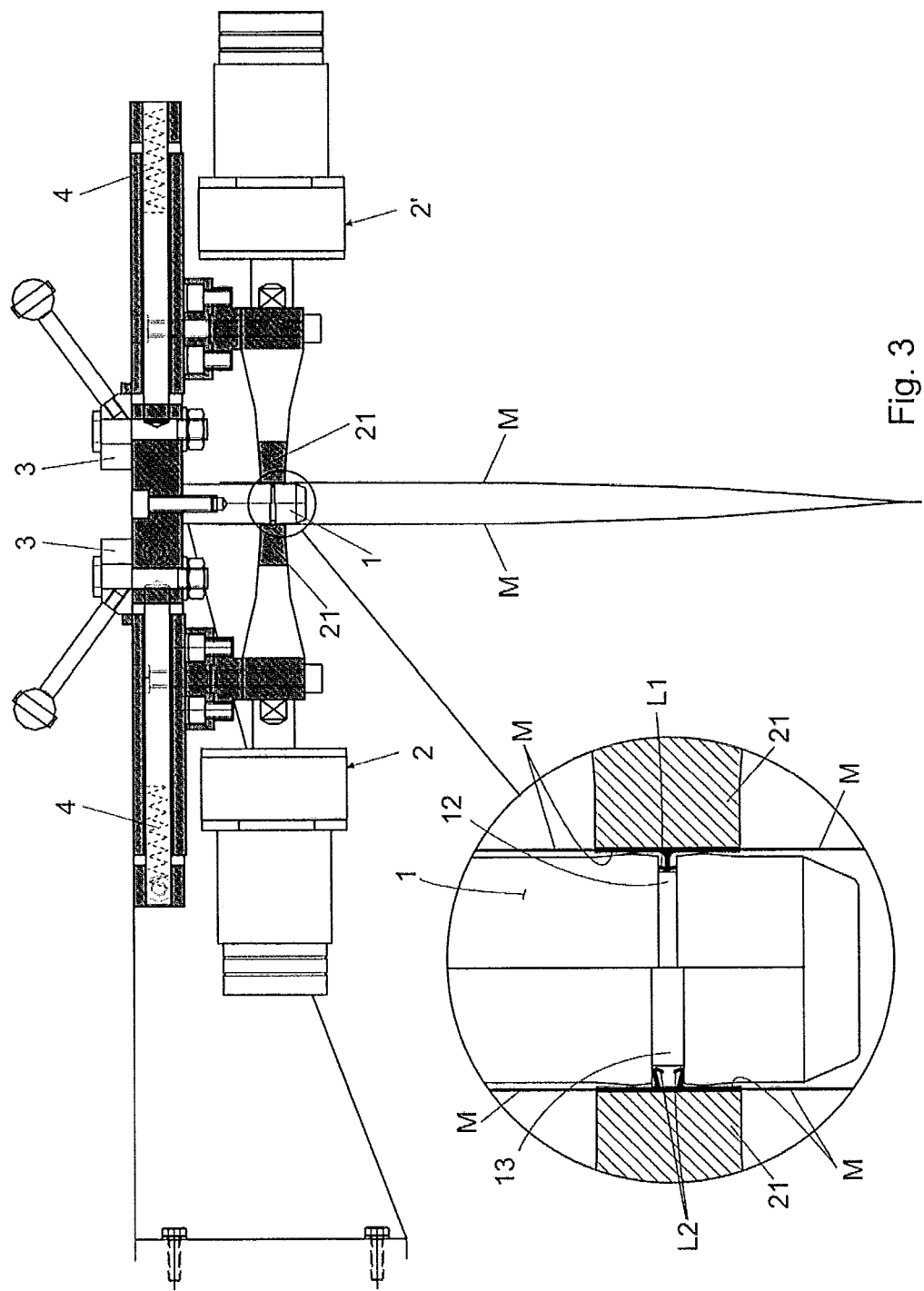
Figure 3A:
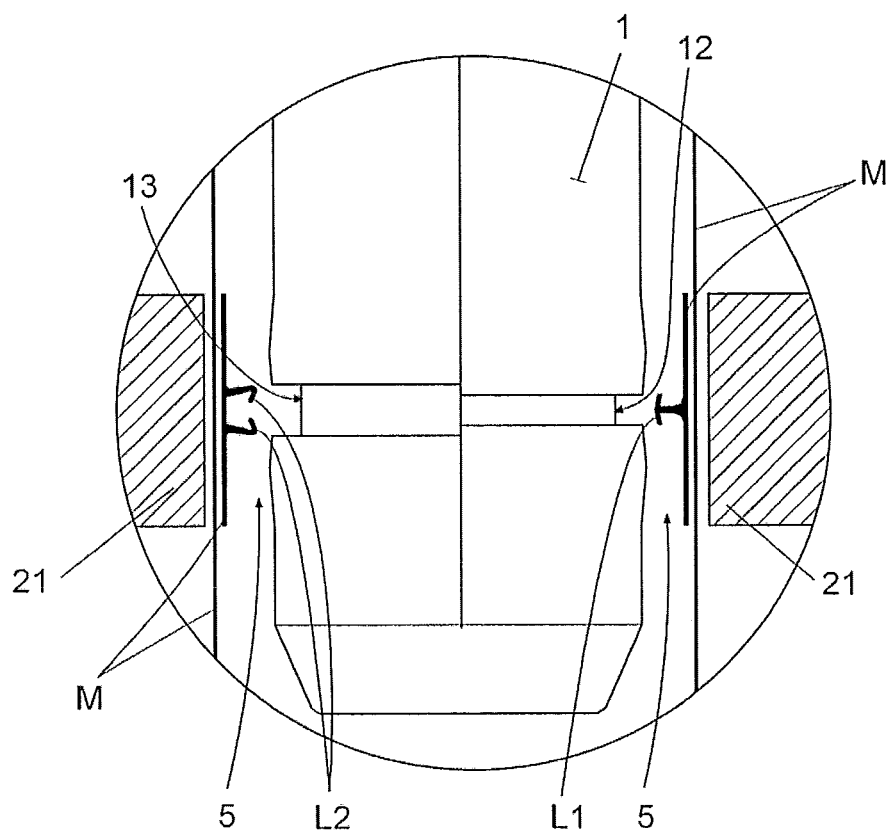
Figure 4:
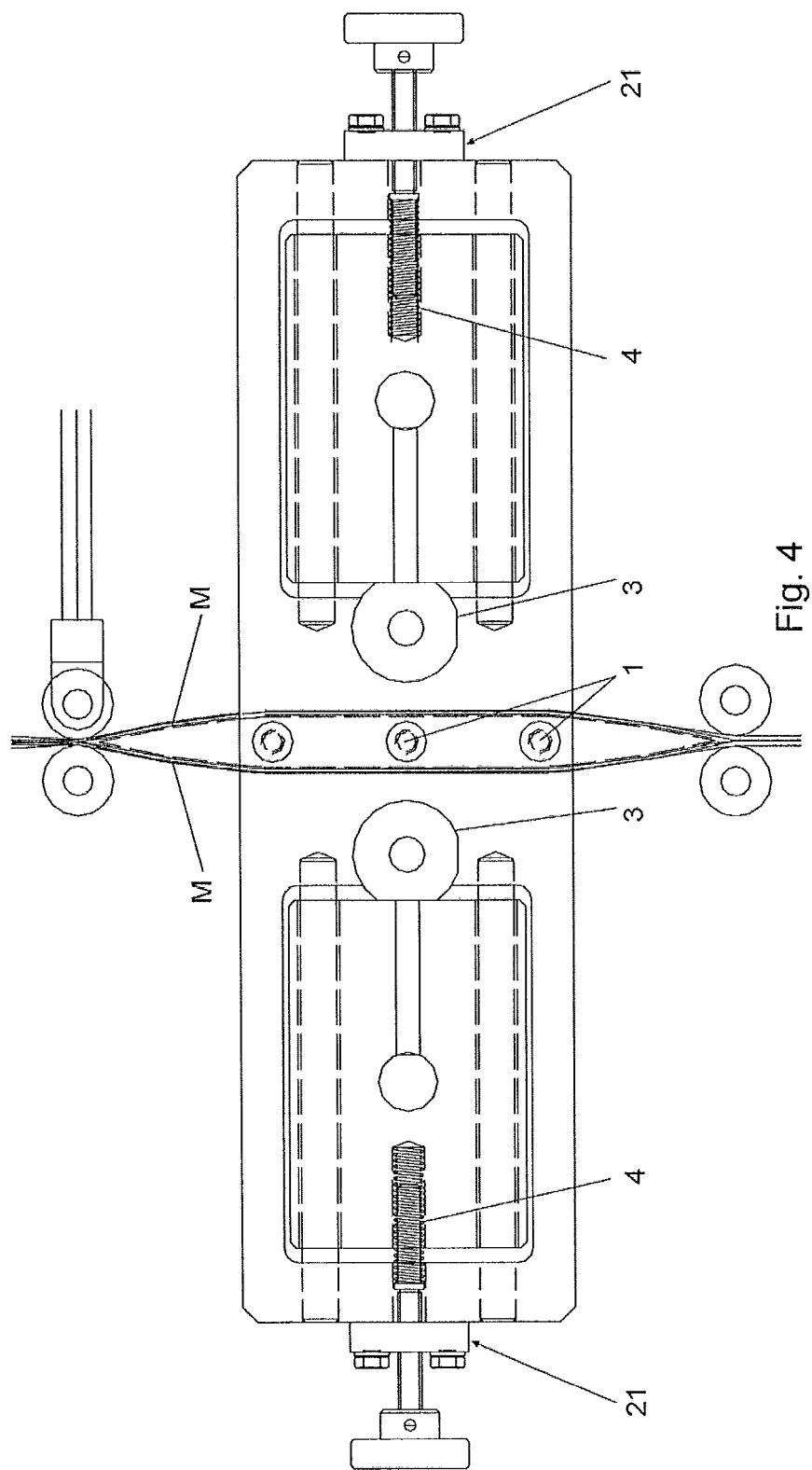

FIG. 3 shows a view from above, as a partial cross-section, of a variation to the setup for the welding device according to the invention, comprising a supporting piece and two ultrasonic welders, with the sonotrodes facing the opposite sides of the aforementioned supporting piece, and the device welding the complementary seals of a zip-type seal on the respective surface areas or sides of a container; and an enlargement of the opposite ends of the sonotrodes facing the supporting piece for the layers of material to be welded;

FIG. 3a shows an enlargement, similar to the previous diagram, with the sonotrodes distanced horizontally from the supporting piece, in a non-operating position of the welding device, and with sheets of material to be welded distanced horizontally to show this clearly; and FIG. 4 shows a top view of the welding device shown in FIG. 3.

DETAILED DESCRIPTION OF CERTAIN EMBODIMENTS

As can be seen in the setup example shown in diagrams 1, 2 and 2a, the welding device comprises a supporting piece (1) for the layers of material (M) to be welded, which, in this example, are the surface areas of a container manufactured continuously; and an ultrasonic welder (2) the sonotrode (21) of which the supporting piece (1) faces horizontally. The device comprises a positioner (3) represented, in this case, by a pneumatic cylinder, which separates the supporting piece (1) from the sonotrode (21), arranging the welding device in a non-operating position represented in diagram 2a, or bringing the supporting piece (1) closer to the sonotrode (21) in an operating position of the welding device, represented in diagrams 1 and 2.

In addition, the device comprises an elastic pusher (4) represented in diagram 1, consisting of, in this case, a spiral spring that acts on the supporting piece (1) and pushes the layers of material (M) to be welded against the sonotrode (21); this elastic pusher (4) enables the supporting piece (1) to trace small movements during welding towards and away from the sonotrode (21), through vibration of the latter, which makes it possible for the layers of material (M) to be welded to advance longitudinally through the packaging machine as welding takes place.

As can be observed in diagrams 2 and 2a, the supporting piece (1) presents longitudinal reliefs (11) at the front aimed in the direction through which the layers of material (M) to be welded advance continuously; in the specific setup shown in diagrams 1 and 2, the welding device is represented in an operating position during closure of the upper mouth of the container manufactured continuously in a horizontal packaging machine. In diagram 2a, the welding device is represented in the non-operating position.

In the setup example shown in diagrams 3, 3a and 4, the welding device comprises two ultrasonic welders (2, 2'), the sonotrodes (21) of which face the opposite sides of a supporting piece (1) for the layers of material (M) to be welded by the respective sonotrodes (21).

In this setup example, the device comprises two positioning elements (3) consisting, in this case, of off-centre paths that, being operated manually, cause the sonotrodes (21) to move towards or away from the corresponding opposite sides of the supporting piece (1): additionally, this device comprises an elastic pusher (4) represented, in this case, by spiral springs that act on the respective ultrasonic welders (2, 2') by placing pressure on the respective sonotrodes (21) against the layers of material (M) to be welded, which are supported on the opposite sides of the supporting piece (1).

Between the supporting piece (1) and the sonotrodes (21) there are two channels (5), referenced in diagram 3a, for the circulation of two groups of layers of material (M) to be welded continuously, and simultaneously, by the respective welding irons.

In this setup example, the supporting piece (1) has longitudinal channels (12, 13) on the opposite sides, to guide the layers of material (M) to be welded through each of the sonotrodes (21) of the ultrasonic welders (2, 2'); in this specific case, one of the layers of material is comprised of one of the complementary seals (L1, L2) of a zip-type seal or "Zipper®", and by one of the sides or surface areas of the container being made continuously.

In this second setup, the device enables continuous and simultaneous, welding in two parallel places, joining the complementary pieces for a seal with the respective sides of the container.

Having described in sufficient detail the nature of the invention, and provided a setup example, it is stated for relevant purposes that the materials, shape, size and arrangement of the elements described can be modified, as long as they do not suppose an alteration of the essential features of the invention which are outlined below.

The invention claimed is:

1. Longitudinal continuous welding device for packaging machines comprising:
    one supporting piece (1) for layers of material to be welded continuously;
    at least one ultrasonic welder (2) equipped with a sonotrode (21), and wherein the sonotrode (21) and the supporting piece (1) face each other horizontally, arranged on opposite sides of a longitudinal path along which the layers of material (M) to be welded continuously advance inside the packaging machine, wherein both the at least one ultrasonic welder (2) and the supporting piece (1) are unable to move in the direction of longitudinal movement of the layers of material (M);
    at least one positioning element (3) to arrange the welding device in a non-operating position, in which the sonotrode (21) of the welder and the supporting piece (1) remain distanced horizontally, or in an operating position for welding in which the sonotrode (21) and the supporting piece (1) are maintained very close to each other; and
    at least one elastic pusher (4), which acts on at least one of the ultrasonic welder (2) and the supporting piece (1) to push them against the opposite sides of the layers of material (M) to be welded continuously;
    wherein said at least one elastic pusher (4) is configured and arranged to enable the separation between the ultrasonic welder (2) and the supporting piece (1) to vary at a very high frequency, due to the action of the sonotrode (21), enabling the layers of material (M) to be welded to continuously advance through the space between the supporting piece (1) and the sonotrode (21) as these conduct the welding of the layers of material (M).

2. The device according to claim 1, wherein at least one of the sonotrode (21) and the supporting surface area of the supporting piece (1) for the layers of material (M) to be welded have longitudinal reliefs (11) on the front, aimed in the direction in which the layers of material (M) to be welded continuously advance.

3. The device according to claim 1, wherein there are two ultrasonic welders (2, 2') with respective sonotrodes (21) facing the opposite sides of a supporting piece (1), and two paths between the supporting piece (1) and the sonotrodes (21) for the circulation of two groups of layers of material (M) to be welded continuously, and simultaneously, by the respective ultrasonic welders (2, 2').

4. The device according to claim 3, wherein the supporting piece (1) presents longitudinal channels (12, 13) on the opposite sides, each for guiding at least one of the layers of material (M) to be welded through each of the ultrasonic welders (2, 2').

* * * * *